United States Patent
Streich

[15] 3,683,634
[45] Aug. 15, 1972

[54] PREFRACTIONATION WITH SUBSEQUENT RECOMBINATION IF FEED IN DOUBLE COLUMN RECTIFIER

[72] Inventor: Martin Streich, Urseler Weg 44, Nieder-Eschbach, Germany

[22] Filed: Aug. 12, 1969

[21] Appl. No.: 849,439

[30] Foreign Application Priority Data

Aug. 24, 1968 Germany..........P 17 94 019.1

[52] U.S. Cl. ..............................62/29, 62/24, 62/28
[51] Int. Cl................F25j 3/00, F25j 3/02, F25j 3/03
[58] Field of Search............62/20, 23, 24, 27, 28, 29, 62/31, 43

[56] References Cited

UNITED STATES PATENTS

| | | |
|---|---|---|
| 2,788,646 | 4/1957 | Rice ..............................62/29 |
| 3,392,536 | 7/1968 | Smith ............................62/31 |
| 2,209,748 | 7/1940 | Schlitt ...........................62/31 |
| 2,729,954 | 1/1956 | Etienne .........................62/28 |
| 3,079,759 | 3/1963 | Schilling.......................62/29 |
| 3,066,494 | 12/1962 | Potts.............................62/29 |
| 2,502,251 | 3/1950 | Dennis..........................62/31 |

*Primary Examiner*—Norman Yudkoff
*Assistant Examiner*—Arthur F. Purcell
*Attorney*—Paul W. Garbo

[57] ABSTRACT

A portion of a pressurized gas mixture containing a component like carbon dioxide which solidifies during cooling is separated into a fraction substantially free of such component and a fraction enriched in such component. The remaining portion of the gas mixture and the two fractions are then fed to different levels of a fractionation zone with the fraction substantially free of such component entering at the highest level and the other fraction at the lowest level.

10 Claims, 3 Drawing Figures

INVENTOR.
MARTIN STREICH

PREFRACTIONATION WITH SUBSEQUENT RECOMBINATION IF FEED IN DOUBLE COLUMN RECTIFIER

BACKGROUND OF THE INVENTION

This invention relates to a process for the treatment of a pressurized gas mixture which contains one or more components that are precipitated in solid form during cool-down, before the gas mixture is subjected to the separation process proper. The objective of this treatment is to keep such components from interfering with the separation process. Primarily, the invention is useful for treating natural gas containing carbon dioxide. However, the invention is not limited to this application.

In the separation of natural gas, the carbon dioxide present is usually removed since, during cool-down, it is precipitated in solid form and plugs piping and equipment. The most commonly used processes provide for carbon dioxide removal by adsorption or washing, before the natural gas enters the low temperature plant. It is the purpose of this invention to eliminate such expensive processes.

A principal object of this invention is to treat a pressurized gas mixture, prior to its actual separation, in such a manner that a solidifiable component such as carbon dioxide will no longer interfere in the low temperature plant. By the separation, the low-boiling components of the gas mixture will, at least partially, be recovered in substantially pure form, whereas the carbon dioxide will leave the low temperature plant together with the remaining portion of the gas mixture.

SUMMARY OF THE INVENTION

In accordance with this invention, a portion of a pressurized gas mixture which contains one or more components that are precipitated in solid form during cool-down, is separated in a prefractionation zone into a fraction essentially free of such components and a fraction containing a higher concentration of such components.

The process of this invention is especially suitable for natural gas containing carbon dioxide from which the nitrogen and part of the methane are to be recovered in substantially pure form by separation in a two-stage rectification zone. Also, this process is particularly advantageous when the rectification is combined with a process for the recovery of helium from natural gas.

As is well-known, carbon dioxide is soluble in methane to only a limited extent, the solubility decreasing rapidly as the temperature goes down. Also, the volatility of carbon dioxide at low temperatures is extremely low. For a two-stage rectification of natural gas at the usual pressures and temperatures, this would mean that any carbon dioxide getting into the low pressure stage could not get out any more and would accumulate there. The process of this invention, however, permits rectification in the usual manner without necessitating removal of the carbon dioxide from the natural gas. The process can also be applied to a one-stage rectification and to a gas mixture other than natural gas.

For a fuller understanding of the invention, two illustrative embodiments will now be described in detail in connection with the accompanying drawings.

BRIEF DESCRIPTION OF THE DRAWINGS

The three drawings have identical reference numerals for identical equipment components.

DESCRIPTION OF PREFERRED EMBODIMENTS

For simplicity, details showing how the individual gas streams are cooled and liquefied have been omitted since anyone skilled in the art is fully familiar with such details.

Figure 1:
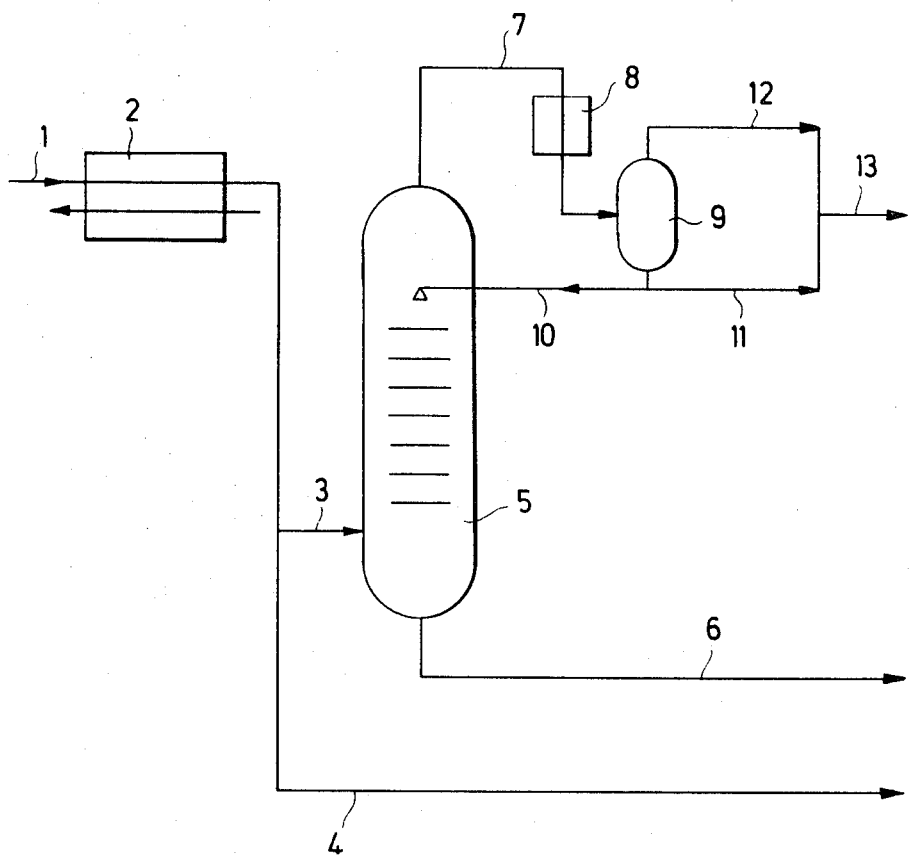
FIG. 1 is a flowsheet of a pre-fractionation of a portion of natural gas containing carbon dioxide into fractions in accordance with this invention.

In the process shown in FIG. 1, the gas mixture to be treated is natural gas containing carbon dioxide and is supplied to line 1 at a temperature of 20° C. and at a pressure of 42 ata (atmospheres absolute).

The natural gas has the following composition:

| | |
|---|---|
| $N_2$ | 14.0 Mol % |
| $CH_4$ | 81.6 " |
| $C_2$ and higher hydrocarbons | 3.4 " |
| $CO_2$ | 1.0 " | and is supplied at a rate of 100,000 $Nm^3/hr$ (normal cubic meters per hour).

In heat exchanger 2 the gas mixture is cooled to approximately its dew point temperature.

Then, the natural gas is divided into partial streams of approximately equal volume in lines 3 and 4. Partial stream 4 is not processed further prior to fractionation. Partial stream 3 is fed into pre-separation column 5. Here, the natural gas containing carbon dioxide is separated into a fraction substantially free of carbon dioxide and a fraction containing a higher concentration of carbon dioxide. The fraction enriched in carbon dioxide is withdrawn through line 6 from the sump of column 5 at a rate of 30,000 $Nm^3/hr$ and at 42 ata, with the following composition:

| | |
|---|---|
| $N_2$ | 7.0 Mol % |
| $CH_4$ | 85.6 " |
| $C_2$ and higher hydrocarbons | 5.7 " |
| $CO_2$ | 1.7 " |

The head fraction leaves column 5 through line 7, is partially liquefied in condenser 8, and separated in separator 9 into gaseous and liquid phases. Part of the liquid phase returns to column 5 as reflux through line 10. The other liquid part, in line 11, merges in line 13 with the gas phase leaving through line 12. Depending on the heat withdrawal, the head fraction in line 13 will be gaseous or liquid or a liquid and vapor mixture. The flow in line 13 is 20,000 $Nm^3/hr$ at a pressure of 42 ata. The composition in line 13 is as follows:

| | |
|---|---|
| $N_2$ | 24.5 Mol % |
| $CH_4$ | 75.5 " |

Figure 2:
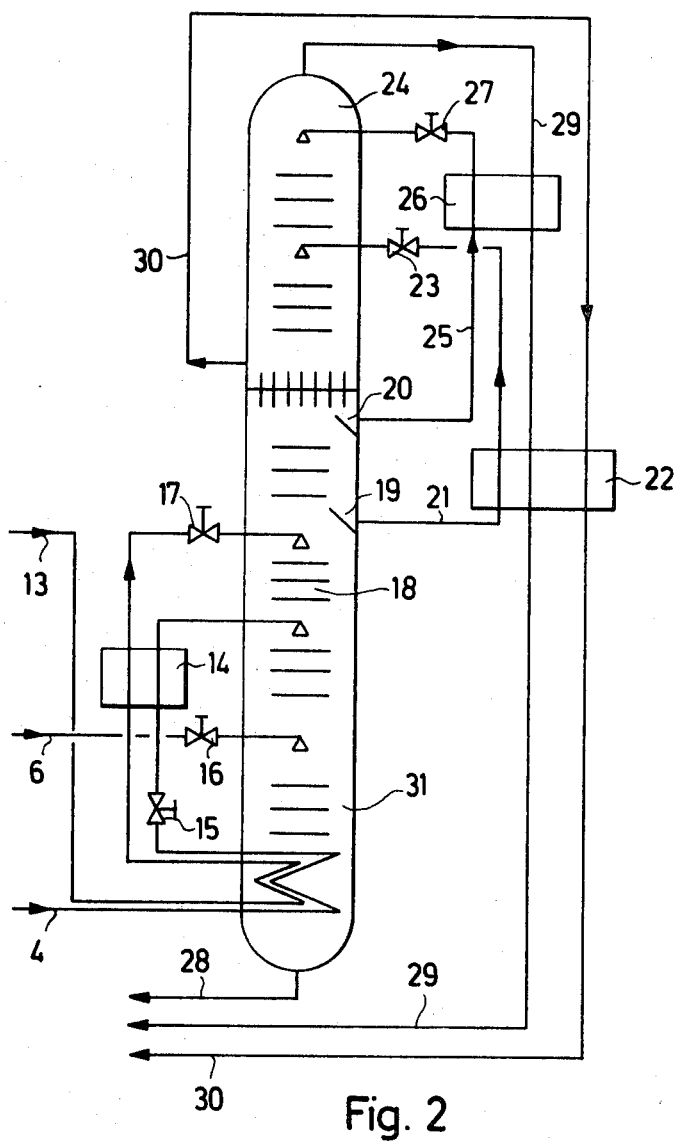
FIG. 2 is a flowsheet of a two-stage rectification that is combined with the process according to FIG. 1.

At this point, three different streams are available: in line 4 natural gas of original composition, in line 6 natural gas enriched in carbon dioxide with a reduced nitrogen content, and in line 13 natural gas free of carbon dioxide with an increased nitrogen content. These streams are now subjected to the actual low temperature process, in this case a two-stage rectification as shown in FIG. 2.

The stream of original composition in line 4 first heats the sump of medium pressure column 31, is expanded in reducing valve 15 and, after flowing through heat exchanger 14, is discharged into medium pressure column 31 where a pressure of 25 ata prevails. Below the feed level of this stream, the carbon dioxide enriched fraction in line 6, after expansion in reducing valve 16, is fed into medium pressure column 31. The gaseous fraction free of carbon dioxide in line 13 is also conducted through the sump of medium pressure column 31 and heat exchanger 14, expanded in reducing valve 17, and fed into medium pressure column 31 above the feed level of the stream of original composition.

Now, the carbon dioxide-free fraction fed into the top portion of medium pressure column 31 washes all carbon dioxide into the sump of medium pressure column 31. No carbon dioxide can pass up through the carbon dioxide washing portion 18. Thus, the wash methane which collects in trough 19, remains free of carbon dioxide. The same applies to the wash nitrogen which accumulates in trough 20. The wash methane is withdrawn from medium pressure column 31 through line 21, cooled in heat exchanger 22, and expanded in reducing valve 23 into low pressure column 24 which is at a pressure of 1.5 ata. Similarly, the wash nitrogen is fed into low pressure column 24 through line 25, heat exchanger 26, and reducing valve 27. Thus, it is possible to keep low pressure column 24 entirely free of carbon dioxide. After heat exchange, the following products are available from the plant at ambient temperature:

a. 60,000 Nm$^3$/hr of a nitrogen-free methane fraction at a pressure of 20 ata flowing from the sump of medium pressure column 31 by way of line 28, and having the following composition:

| | |
|---|---|
| $CH_4$ | 92.6 Mol % |
| $C_2$ and higher hydrocarbons | 5.7 " |
| $CO_2$ | 1.7 " | b. 14,000 Nm$^3$/hr of methane-free nitrogen leaving the top of low pressure column 24 at a pressure of 1.1 ata through line 29.

c. 26,000 Nm$^3$/hr of nitrogen-free methane flowing from the sump of low pressure column 24 at a pressure of 1.1 ata through line 30.

It is evident that the process just described is of particular advantage in cases where helium is to be recovered from the natural gas.

Figure 3:
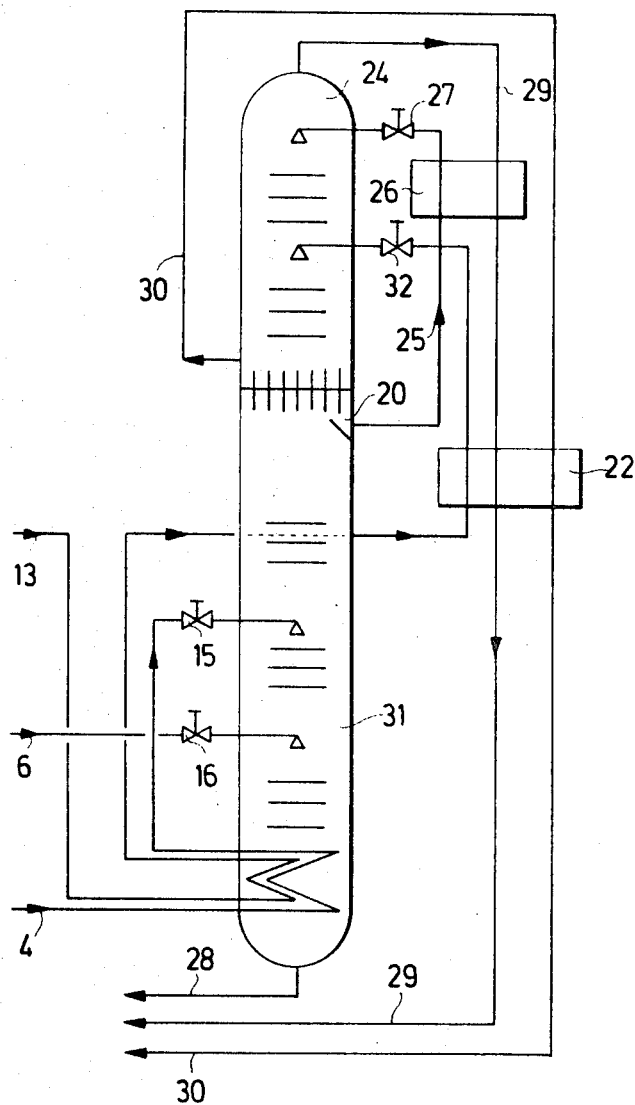
FIG. 3 is a flowsheet of an alternate to FIG. 2.

The modification of the process shown in FIG. 3 does not have the washing portion 18 and heat exchanger 14 of FIG. 1. The carbon dioxide-free fraction in line 13 is not fed into medium pressure column 31, but is fed in liquid condition, after heating the sump of medium pressure column 31 and after being cooled in heat exchanger 22, into low pressure column 24 through reducing valve 32.

Thus, trough 19, line 21, and reducing valve 23 for the wash methane are also omitted. The wash nitrogen is freed of carbon dioxide by rectification.

What is claimed is:

1. A process for fractionating a pressurized gas mixture containing carbon dioxide in a fractionation zone having a high pressure stage and a low pressure stage, which comprises cooling said mixture containing said carbon dioxide to close to its dew point, dividing the thus cooled mixture containing said carbon dioxide into a first stream and a second stream, fractionating said first stream into a head fraction substantially free of said carbon dioxide and a bottom fraction enriched in said carbon dioxide, passing said head fraction substantially without change of pressure in indirect heat exchange with liquid in the bottom of said high pressure stage, expanding and directly introducing said bottom fraction at a low level in said high pressure stage of said fractionation zone, introducing said second stream at a second level above said low level in said high pressure stage, introducing said head fraction after said indirect heat exchange into said fractionation zone at a third level above said second level in said high pressure stage, passing liquid from the top of said high pressure stage into the top of said low pressure stage, and recovering from the top and bottom of said low pressure stage product fractions substantially free of said carbon dioxide and from the bottom of said high pressure stage a product fraction containing substantially all of said carbon dioxide originally present in said mixture.

2. The process of claim 1 wherein the first stream and the second stream are approximately equal in volume.

3. The process of claim 1 wherein the gas mixture is natural gas containing carbon dioxide.

4. The process of claim 1 wherein the gas mixture is natural gas containing carbon dioxide and nitrogen, and substantially pure methane product is recovered from the bottom of the low pressure stage.

5. The process of claim 4 wherein the first stream and the second stream are approximately equal in volume.

6. A process for fractionating a pressurized gas mixture containing carbon dioxide in a fractionation zone having a high pressure stage and a low pressure stage, which comprises cooling said mixture containing said carbon dioxide to close to its dew point, dividing the thus cooled mixture containing said carbon dioxide into a first stream and a second stream, fractionating said first stream into a head fraction substantially free of said carbon dioxide and a bottom fraction enriched in said carbon dioxide, passing said head fraction substantially without change of pressure in indirect heat exchange with liquid in the bottom of said high pressure stage, expanding and directly introducing said bottom fraction at a low level in said high pressure stage of said fractionation zone, introducing said second stream at a second level above said low level in said high pressure stage, introducing said head fraction after said indirect heat exchange into the middle portion of said low pressure stage, passing liquid from the top of said high pressure stage into the top of said low pressure stage, and recovering from the top and bottom of said low pressure stage product fractions substantially free of said carbon dioxide and from the bottom of said high pressure stage a product fraction containing substantially all of said carbon dioxide originally present in said mixture.

7. The process of claim 6 wherein the gas mixture is natural gas containing carbon dioxide and nitrogen, and substantially pure methane product is recovered from the bottom of the low pressure stage.

8. The process of claim 7 wherein the first stream and the second stream are approximately equal in volume.

9. The process of claim 6 wherein the first stream and the second stream are approximately equal in volume.

10. The process of claim 6 wherein the gas mixture is natural gas containing carbon dioxide.

* * * * *

UNITED STATES PATENT OFFICE
CERTIFICATE OF CORRECTION

Patent No. 3,683,634      Dated August 15, 1972

Inventor(s) Martin Streich

It is certified that error appears in the above-identified patent and that said Letters Patent are hereby corrected as shown below:

In the title, both on the front page and at the top of column 1, "IF" should read -- OF --.

On the front page, below item " [72] " should be inserted -- [73] Assignee: Linde Aktiengesellschaft, Wiesbaden, Germany --.

Signed and sealed this 12th day of December 1972.

(SEAL)
Attest:

EDWARD M. FLETCHER, JR.       ROBERT GOTTSCHALK
Attesting Officer      Commissioner of Patents